US006089800A

United States Patent [19]

Tabellini

[11] Patent Number: 6,089,800

[45] Date of Patent: Jul. 18, 2000

[54] MOBILE PROTECTIVE COVER FOR THE SLIDING GUIDES OF MACHINE TOOL PARTS

[75] Inventor: Giorgio Tabellini, Sasso Marconi, Italy

[73] Assignee: P.E.I. Protezioni Elaborazioni Industriali S.r.l., Bologna, Italy

[21] Appl. No.: 09/113,412

[22] Filed: Jul. 10, 1998

[30] Foreign Application Priority Data

Jul. 25, 1997 [IT] Italy ................................ BO97A0458

[51] Int. Cl.[7] ........................................ B23C 9/00

[52] U.S. Cl. ................................ 409/134; 29/DIG. 56; 29/DIG. 94; 74/608; 160/202; 160/222

[58] Field of Search ................................ 409/134, 137; 29/DIG. 56, DIG. 94; 160/202, 222, 223, 224; 74/608

[56] References Cited

U.S. PATENT DOCUMENTS

| | | | |
|---|---|---|---|
| 3,578,061 | 5/1971 | Hascheck | 160/202 |
| 3,603,373 | 9/1971 | Loos | 160/202 |
| 3,659,113 | 4/1972 | Loos | 160/202 |
| 3,751,120 | 8/1973 | Kietz | 308/3 A |
| 3,845,591 | 11/1974 | Stine | 160/202 |
| 4,522,246 | 6/1985 | Bierbrauer et al. | 160/223 |
| 4,635,699 | 1/1987 | Kauffmann et al. | 160/211 |
| 4,886,375 | 12/1989 | Tsukada | 384/15 |
| 5,119,869 | 6/1992 | Henning | 409/134 |
| 5,156,195 | 10/1992 | Wehler et al. | 160/202 |
| 5,169,223 | 12/1992 | Suzuki et al. | 312/330.1 |
| 5,807,043 | 9/1998 | Blank | 409/134 |
| 5,863,163 | 1/1999 | Wehler | 409/134 |

FOREIGN PATENT DOCUMENTS

| | | | |
|---|---|---|---|
| 2642060 | 3/1978 | Germany | 409/134 |
| 3027443 | 2/1982 | Germany | 409/134 |

*Primary Examiner*—Daniel W. Howell
*Assistant Examiner*—Christopher Kirkman
*Attorney, Agent, or Firm*—Fay, Sharpe, Fagan, Minnich & McKee, LLP

[57] ABSTRACT

The present invention concerns a protective cover for the sliding guides of a mobile machine tool part and comprises a set of rigid panels which overlap and are guided in such a way that they slide parallel with the machine tool guides, and panel pulling means, designed so that, when a first, driven panel is moved, they allow the subsequent panels in the set to be pulled. The pulling means comprise a pulling element, attached to the first panel, parallel with a direction transversal to the set of planes upon which the subsequent panels in the set lie; and contact faces, on the subsequent panels, opposite the pulling element. The contact faces are positioned in the path of the pulling element at different positions, longitudinal to the guides, so that each is intercepted by the pulling element at a different time as the element moves, thus allowing all of the subsequent panels in the set to be pulled.

8 Claims, 2 Drawing Sheets

21
1
7
23
25
9
11
4b
25
9
11
23
4b
25
9
11
4b
20
3
25
III
III
4a
22
22
2
5
23
2

8
1
21
IV
IV
4b
23
10
4b
23
10
4b
23
10
20
4a
6
22
22

9
11
5
13
9
4b
4a
17
15
12
17

4b
14
4a
20
6
10

MOBILE PROTECTIVE COVER FOR THE SLIDING GUIDES OF MACHINE TOOL PARTS

BACKGROUND OF THE INVENTION

The present invention relates to a mobile protective cover for sliding guides, in particular those of a mobile machine tool part.

In machine tools equipped with alternating parts that move on linear guides, the guides are normally fitted with protective covers, designed to prevent accidents as well as to protect the guides from dust, wood or metal shavings or products of working which could lead to mechanical damage to the guides.

The present invention concerns, in particular, a cover of the type comprising a set of rigid, sheet metal panels, which overlap and are connected to one another and are guided with the possibility of sliding relative to one another in a direction tangential to a reciprocal contact surface, so as to vary the length of the cover, whose end panels are connected to the mobile part and to the machine structure, each time according to the movements of the mobile part along the guides.

The movement of the cover panels is made possible by pulling means which, in covers of the known type, are pins and slots, positioned in an orderly fashion between all of the pairs of contiguous panels of the cover.

Due to the thinness of the panels, the slots are not very deep, nor are the pins very long; this leads to various disadvantages, including: rapid deterioration of the cover, following the high levels of mechanical stress that cause the pins to wear rapidly and disengage from the slots; noisy cover operation, due to the sliding and impact of metal elements.

The aim of the present invention is, therefore, to overcome the above-mentioned disadvantages by means of a lasting metal cover, with silent, reliable operation.

SUMMARY OF THE INVENTION

This aim is achieved by a protective cover of the type described in the preamble to claim 1, in which the pulling means comprise at least one pulling element, attached to a first, driven panel and projecting in a direction transversal to the set of planes in which the subsequent panels in the set lie; contact faces for the pulling element, on the subsequent panels in the set, opposite the pulling element, the contact faces positioned in the path of the pulling element at different positions, longitudinal to the guides, so that each is intercepted by the pulling element at a different time as the element moves, allowing the successive pulling of all of the subsequent panels in the set by the pulling element.

The cover made in accordance with the present invention has many advantages. The presence of a single pulling element that pulls all of the panels of the cover in succession makes it possible to obtain a cover in which performance and durability can be obtained irrespective of the thickness of the sheet metal used to make the panels.

Since there are no particular design constraints on the size of the pulling element, it is possible to insert damping elements between the parts of the cover that make direct contact, thus allowing silent cover operation.

If these damping elements are also made of a low-friction material, a further advantage is reduced wear on the moving parts of the cover.

BRIEF DESCRIPTION OF THE DRAWINGS

The technical characteristics and advantages of the invention, in accordance with the aims, are apparent from the detailed description which follows, with reference to the accompanying drawings, which illustrate preferred embodiments of the invention and in which.

DESCRIPTION OF THE PREFERRED EMBODIMENTS

Figure 1:
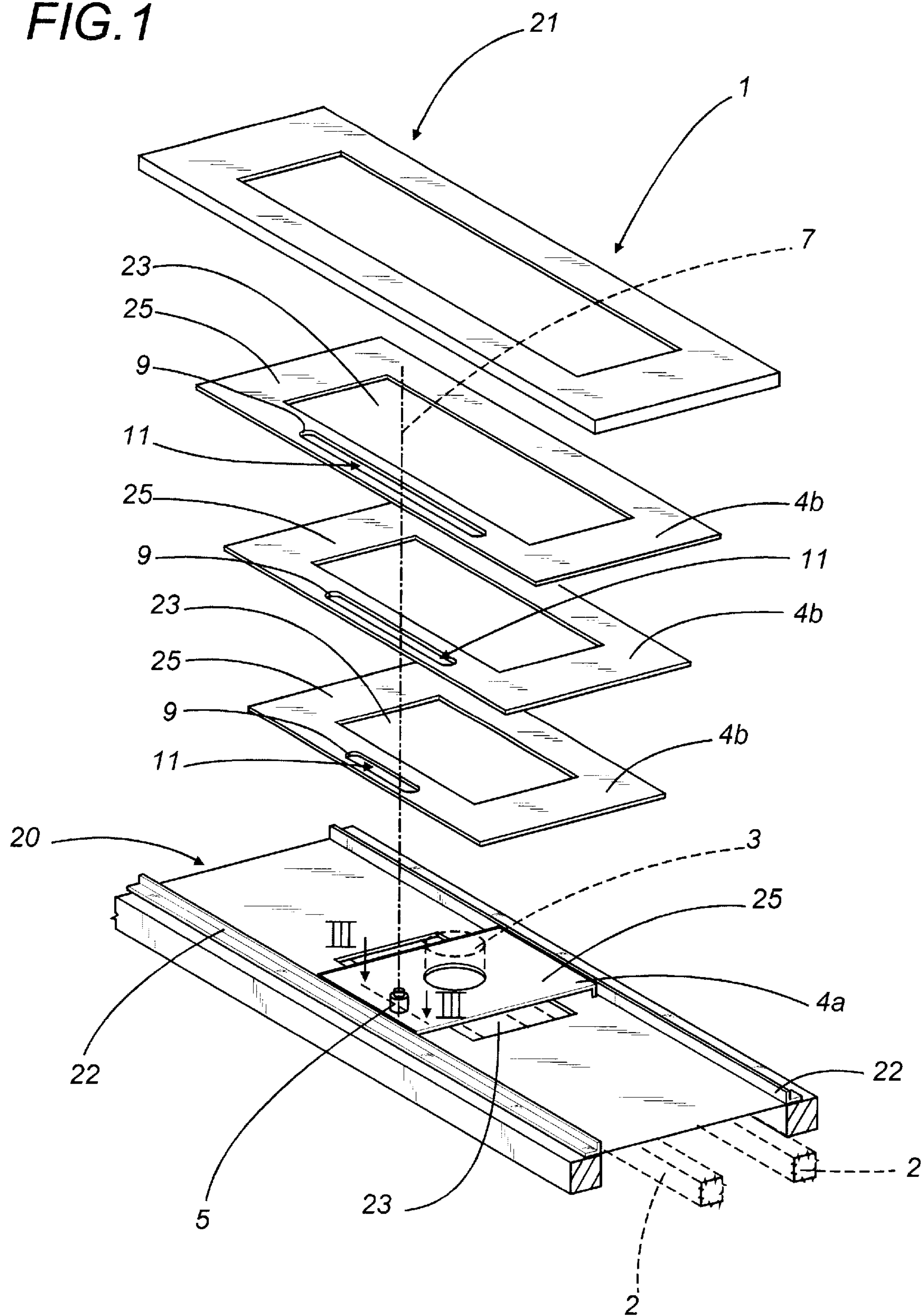
FIG. 1 is an exploded perspective assembly view of a cover according to the present invention.

With reference to FIG. 1, the numeral 1 indicates as a whole a protective cover for the sliding guides 2 of a mobile part 3 on a machine tool, such as a spindle, machining head or a generic machining part. The guides 2 and mobile part 3 are illustrated schematically, since they are not part of the subject matter of the present invention, in a configuration which envisages the horizontal positioning of the guides 2, although the latter could also be positioned in a vertical or angled configuration.

The cover 1 basically comprises a frame 20, a counter-frame 21 and a set of flat, rigid panels 4*a,* 4*b.*

The frame 20 and counter-frame 21 are made of molded sheet metal and are shaped in such a way that they define parallelepiped shells, open at the center, positioned opposite one another, it being possible to attach them to one another in a direction 7 transverse to the plane upon which they lie, together delimiting an intermediate containment cavity between parallel guide walls 22, attached to the frame 20 in such a way that they project vertically.

The quadrangular panels 4*a,* 4*b* are made of sheet metal and have openings 23 at the center. They overlap one another in a pack and make contact with one another between the frame 20 and counter-frame 21; they also have pairs of opposite sides 25 in contact with and attached at the guide walls 22 of the frame 20.

The panels 4*a,* 4*b* are, therefore, held in the cavity between the guide walls 22 of the frame 20 and remain able to slide over one another between the frame 20 and counter-frame 21, longitudinal to the guides 2 of the machine tool.

The size of the sides 25 of the panels 4*a,* 4*b* adjacent to the guide walls 22 of the frame 20 is such that all of the panels 4*a,* 4*b* in the set are of different length; these lengths gradually increase, by small amounts, from a first panel 4*a* near the frame 20, through all of the other panels 4*b* in the set, generically called the subsequent panels, as far as the last panel 4*b* in the set, adjacent to the counter-frame 21, the last panel being the longest.

Between the first and the subsequent panels 4*a,* 4*b* there are pulling means, designed so that when the first panel 4*a* is moved, for example driven by the mobile part 3 on the machine, they allow the pulling, in succession, of all of the remaining panels 4*b* which overlap it in the set.

For this purpose, the pulling means comprise a pulling element 5; 6 attached to the first panel 4*a* and a set of contact faces 9; 10 attached to the subsequent panels 4*b* in the set.

In a first embodiment, illustrated in FIG. 1, the pulling element is a cylindrical pin 5, whilst the contact faces are the walls 9 of slots 11 made in each of the subsequent panels 4*b.*

The pin 5 is offset from the first panel 4*a* and projects in the direction 7 transverse to the set of planes in which all the panels 4*a,* 4*b* in the set lie, passing through all of the slots 11 in the subsequent panels 4*b*, made for this purpose on the same side of the cover 1, one above the other.

The slots 11 are of different lengths, staggered according to small increasing size intervals, longitudinal to the guides 2, from the first panel 4*a*, to the last of the subsequent panels 4*b* of the cover 1.

In practice, the function of the cover 1 is easily understood starting with FIG. 1, observing that when the first panel 4*a* is moved by the part 3 on the machine tool, the pin 5 first moves freely along the slots 11 in the subsequent panels 4*b* for a given distance without transmitting its movement to the remaining panels 4*b* in the set, then, one by one, it makes contact with the corresponding faces 9 of each slot 11, gradually causing all of the panels 4*b* in the set to move, one after another. The spread of the sliding motion from one panel 4*a* to the other 4*b* in the cover 1 therefore allows the driving part 3 to move freely along its own guides 2, whilst the latter remain constantly shielded by the cover 1.

The cover 1 also comprises (FIG. 3) damping means positioned between the pin 5 and the slots 11, the purpose of the damping means being to make the contact between the pin 5 and the contact faces 9 gradual and without impact. Said means comprise a covering element 13, this being a pad of material that yields elastically, which is wound around the pin 5 and makes contact with the walls 9 of the slots 11. Moreover, the damping effect can be advantageously combined with fitting the pin 5 elastically on the first panel 4*a*. This is achieved by providing a fixing seat 15 for the pin 5 on the first panel 4*a* (FIG. 2), the shape and size of said seat allowing a compression spring 12 to be housed in it, the spring oriented longitudinal to the seat 15 and positioned between the pin 5 and opposite walls 17 of the seat 15. The spring 12 holds the pin 5 stably in contact with one of the walls 17 of the seat 15, but allows the pin 5 a given amount of movement relative to the seat 15 in a direction longitudinal to the sliding guides 2 of the part 3 on the machine tool.

Figure 4:
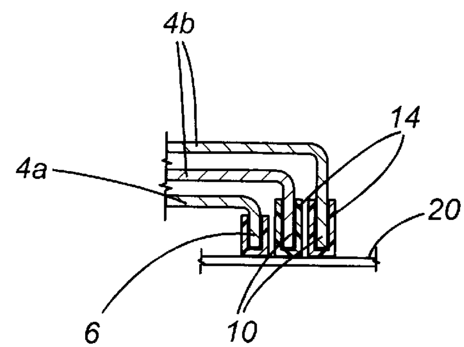

An alternative embodiment of the cover 1, illustrated in FIG. 4 illustrates, in particular, a configuration of the pulling means comprising a pulling element which is a folded edge 6 of the first panel 4*a*. The contact faces 10 for the pulling element 6 are, in this case, folded edges 10 of the subsequent panels 4*b*, the edges 10 projecting transversally to the planes in which the panels 4*b* lie and parallel with one another, until they make contact with the frame 20 of the cover 1. The contact faces 10 are positioned in the path of the pulling element 6 at different positions, longitudinal to the guides 2 on the machine tool.

Since all of the panels 4*a*, 4*b* in the set are in sliding contact with the frame 20, when the first panel 4*a* moves parallel with the guides 2 of the driving part 3, its movement trajectory is gradually intercepted by the contact faces 10 of the subsequent panels 4*b* which, being moved longitudinal to one another, are intercepted at different times, so that the motion of the first panel 4*a* is transmitted to the subsequent panels 4*b* in succession, with an effect identical to that described in the operation of the embodiment of the cover 1 illustrated in FIG. 1.

As regards the damping means, in this case it is again possible to envisage the presence of covering elements 14 (FIG. 4) made of a material that yields elastically, and in particular with a low friction coefficient, which cover the folded ends 10 of all of the panels 4*a* and 4*b* in the set and guarantee reciprocal contact without impact and silent running of the panels 4*a*, 4*b* on the frame 20.

Figure 2:
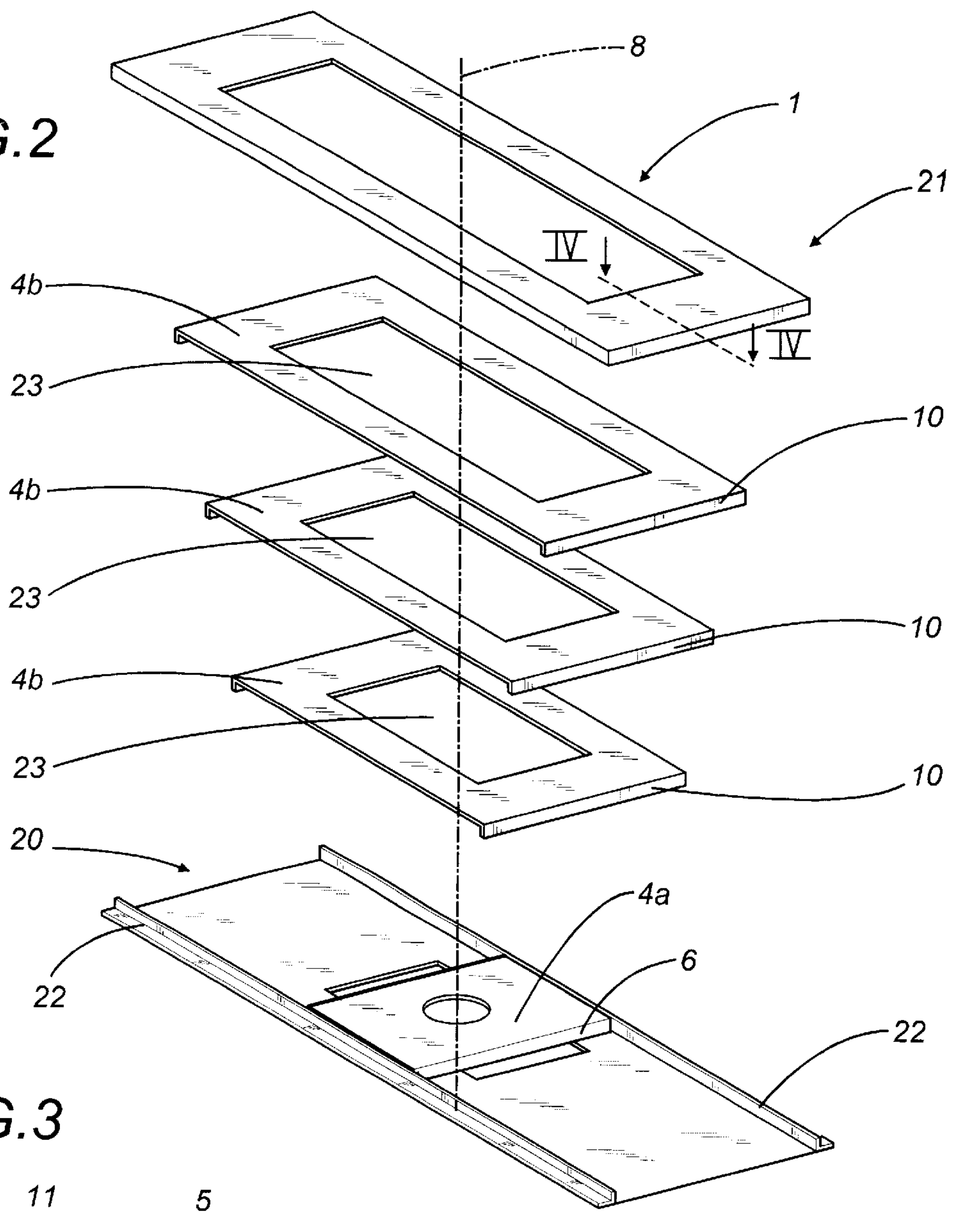
FIG. 2 is an exploded perspective assembly view of an alternative embodiment of the cover according to the present invention.
Figure 3:
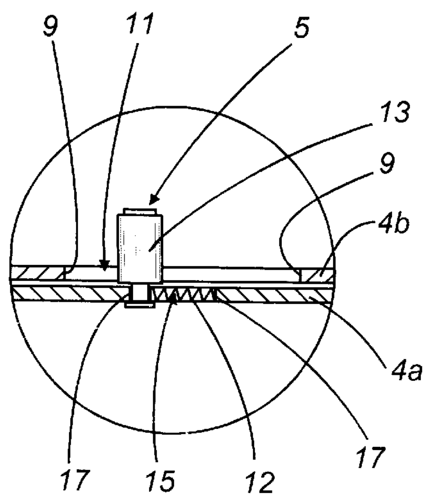
FIGS. 3 and 4 are scaled-up partial cross-sections along lines III–III and IV–IV illustrated in FIGS. 1 and 2, illustrating two different embodiments of cover damping means.

Compared with the solution in FIG. 1, the solution in FIG. 2 illustrates a cover 1 that is wider overall but has an improved seal against the infiltration of dust and shavings, and a simpler construction, making it more economical.

The above-mentioned technical characteristics reveal that the cover 1 according to the present invention achieves the aims indicated and, whatever the embodiment, is more reliable; moreover, it allows a significant simplification of the construction compared with covers of the known type and so is more economical.

The invention described can be subject to modifications and variations without thereby departing from the scope of the inventive concept. Moreover, all the details of the invention may be substituted by technically equivalent elements.

What is claimed is:

1. A protective cover for sliding guides of a mobile part on a machine tool, the cover comprising a set of rigid panels, said panels overlapping one another and being guided in such a way that they can slide relative to one another parallel with the length of the guides on the machine tool; panel pulling means, being designed so that when a first panel moves, driven by the mobile part on the machine tool, the subsequent panels in the set are pulled in succession; the cover being characterized in that the pulling means comprise at least one pulling element, this being attached to the first panel, said first panel being driven parallel with a direction transverse to the set of planes upon which the subsequent panels in the set lie; and pulling element contact faces, these being made on the subsequent panels in the set, and being opposite the pulling element and at different positions along its path, longitudinal to the guides, in such a way that each is intercepted by the pulling element at a different time as the pulling element moves, allowing all of the subsequent panels in the set to be moved by the pulling element.

2. The cover according to claim 1 wherein the pulling element is a pin attached to the first panel and the contact faces are the walls of slots in the subsequent panels, the pin passing through all of the slots.

3. The cover according to claim 2 wherein the first, driven panel has a fixing seat for the pulling element, the seat housing a spring which is part of a damping means, said spring being inserted between the pin and opposite walls of the seat in such a way that the pin is stably fixed to the seat, although it can move within the seat.

4. The cover according to claim 2 further comprising damping means comprising covering elements, these being made of a material that yields elastically, wound around the pin and making contact with the walls of the slots.

5. The cover according to claim 1 wherein the pulling element is a folded edge of the first panel and the contact faces are folded edges of the subsequent panels, projecting transversely to the plane upon which the subsequent panels lie and intercepting the movement trajectory of the pulling element.

6. The cover according to claim 5 further comprising damping means comprising covering elements, these being made of a material that yields elastically and being inserted between the pulling element on the first panel and the folded ends of the subsequent panels.

7. The cover according to claim 6 wherein at least the covering elements of the folded ends of the subsequent panels are made of a low-friction material.

8. The cover according to claim 1 further comprising damping means positioned between the pulling element and the contact faces, so that the contact between them is gradual.

* * * * *